Nov. 17, 1964 J. RABINOW 3,157,855

OPTICAL READING MACHINE WITH ROTARY MASKS

Filed Sept. 21, 1961 2 Sheets-Sheet 1

INVENTOR

Jacob Rabinow

BY Joseph A. Genovese & Max L. Libman

ATTORNEYS

Nov. 17, 1964 J. RABINOW 3,157,855

OPTICAL READING MACHINE WITH ROTARY MASKS

Filed Sept. 21, 1961 2 Sheets-Sheet 2

INVENTOR

Jacob Rabinow

BY Joseph A. Genovese & Max L. Libman

ATTORNEYS

United States Patent Office 3,157,855

Patented Nov. 17, 1964

3,157,855
OPTICAL READING MACHINE WITH ROTARY MASKS

Jacob Rabinow, Takoma Park, Md., assignor, by mesne assignments, to Control Data Corporation, Minneapolis, Minn., a corporation of Minnesota Filed Sept. 21, 1961, Ser. No. 139,711
11 Claims. (Cl. 340—146.3)

This invention relates to reading machines and particularly to optical mask machines.

A number of years ago I constructed a reading machine using an optical mask having mask elements on which images of characters to be recognized were projected. A photomultiplier located behind the mask provided outputs corresponding to the degree of match between the character images and the mask elements, where each element was in the form of one character of a given group, for instance numbers, letters, etc. Features of this machine are described in the U.S. Patent No. 2,933,246.

Since the construction and successful operation of the above machine (and even before that time, e.g. J. Rabinow Patent No. 2,795,705) I made various improvements in optical mask reading machines. Contemporary optical mask systems of other inventors include the machine disclosed in the G. Scarrott Patent No. 2,985,366. The Scarrott machine is interesting since it uses a rotary disc provided with a mask for each character, and the disc has an optical code equivalent of the character that each mask represents. Another patent disclosing a single mask and optical code equivalent for each character is the Sharpels Patent No. 2,228,782. An object of my present invention is to provide further improvements in optical mask reading machines, particularly those using a rotary support for a plurality of masks where a code equivalent of each character is rotatable with the support.

My improvements are in the mask system itself (described later) and in the way that character-identity intelligence is used when derived from the masks. Regarding the mask system, the masks are in "groups" instead of the usual individual mask representing each character. I have, for at least some of the characters, an "assertion" mask and a "negation" mask to form a "group," whose outputs are combined to provide a control signal representing the degree of correlation between an unknown character and the mask group. The highest correlation signal ultimately triggers the readout of the character-identity code for that mask-group which is responsible for the "best" (highest, lowest, etc.) control signal.

The "assertion" and "negation" masks are constructed like the masks described in my copending application Serial No. 107,135. Reference to that application will provide a definition of the terms "assertion" and "negation" and "weighting" as used herein, and will provide numerous examples of mask-groups representing different characters and, very important, the emphasis that is placed on those parts and pieces of characters which distinguish them from all others which the machine is expected to identify. Furthermore, the term "mask group" does not imply separate or individual masks. Obviously, two or more masks of a given group may be made on a single photographic negative (or the equivalent) so long as the functional utility of the segments of the mask operate to combine the intelligence derived at the mask itself.

A feature of my invention is that my machine does not require an absolute match between an unknown character and the masks. On the contrary, I use a "best of match" principle where the machine will identify a character on the basis that the unknown character is more like a given character than any other. This feature is deemed to be an important distinction between my machine and the machines disclosed in Patent Nos. 2,985,366 and 2,228,782 as explained below:

In both of these patents, characters are recognized on an absolute basis, i.e. a character image is compared to a mask and if it satisfies the mask, it is recognized without regard to other possible characters. This technique ordinarily requires 100% mask-character image correlation. Poorly printed or poorly registered characters will not be recognized under these circumstances. A recognition threshold below 100% correlation can be established, but in absolute-decision machines this reduces the certainty of recognition and introduces other problems, such as ambiguities, i.e. recognizing an unknown character as more than one character.

In my system, the image of an unknown character is compared to every mask-group, even though the first group may occasionally yield a "perfect" correlation signal. The mask-group responsible for the best correlation signal (not necessarily 100% correlation) when all mask-groups have had exposure to the image, is selected as the group providing the signal to read out the character identity from a prerecorded code.

There are a number of possible modes of operation for machines constructed in accordance with my invention. One is to rotate the disc which supports the mask groups through a complete cycle and continually record signals proportional to the outputs of the transducers behind the rotary masks. Then, during the next cycle of rotation of the disc (or after "$n$" scanning cycles of rotation), these recorded signals are read out, compared, the highest signal selected, and the highest signal is used to trigger the read out of a prerecorded binary code associated with that mask group which was responsible for the highest recorded signal.

In practice of my invention using "$n$" scanning cycles, a signal corresponding to the degree of match or the identity of a character as a result of the first scanning cycle, is recorded. During subsequent scanning cycles (to the $n$th cycle) the previously recorded signal is replaced by a new signal if, during at least one of the subsequent cycles, a more certain identity of the character is made.

Another form of my invention has a simpler memory device e.g. a single capacitor, in place of the magnetic memory for recording signals proportional to the degree of match between the mask groups and the unknown characters. In this form, the character image examination and signal comparison can be made in a single revolution of the disc by comparing the transducer outputs during one revolution and storing only the highest correlation signal. Toward the end of the disc revolution this highest signal is used to trigger the readout of the magnetic code which corresponds to the mask group responsible for the highest correlation signal.

Other objects and features of importance will become evident in following the description of the illustrated forms of the invention which are given by way of example only.

FIGURE 1 is a diagrammatic view showing one embodiment of the reading machine.

FIGURE 1$a$ is a schematic view showing one of the many possible mask-groups together with the details of the adder in FIGURE 1.

Figures 2, 3, 3A:
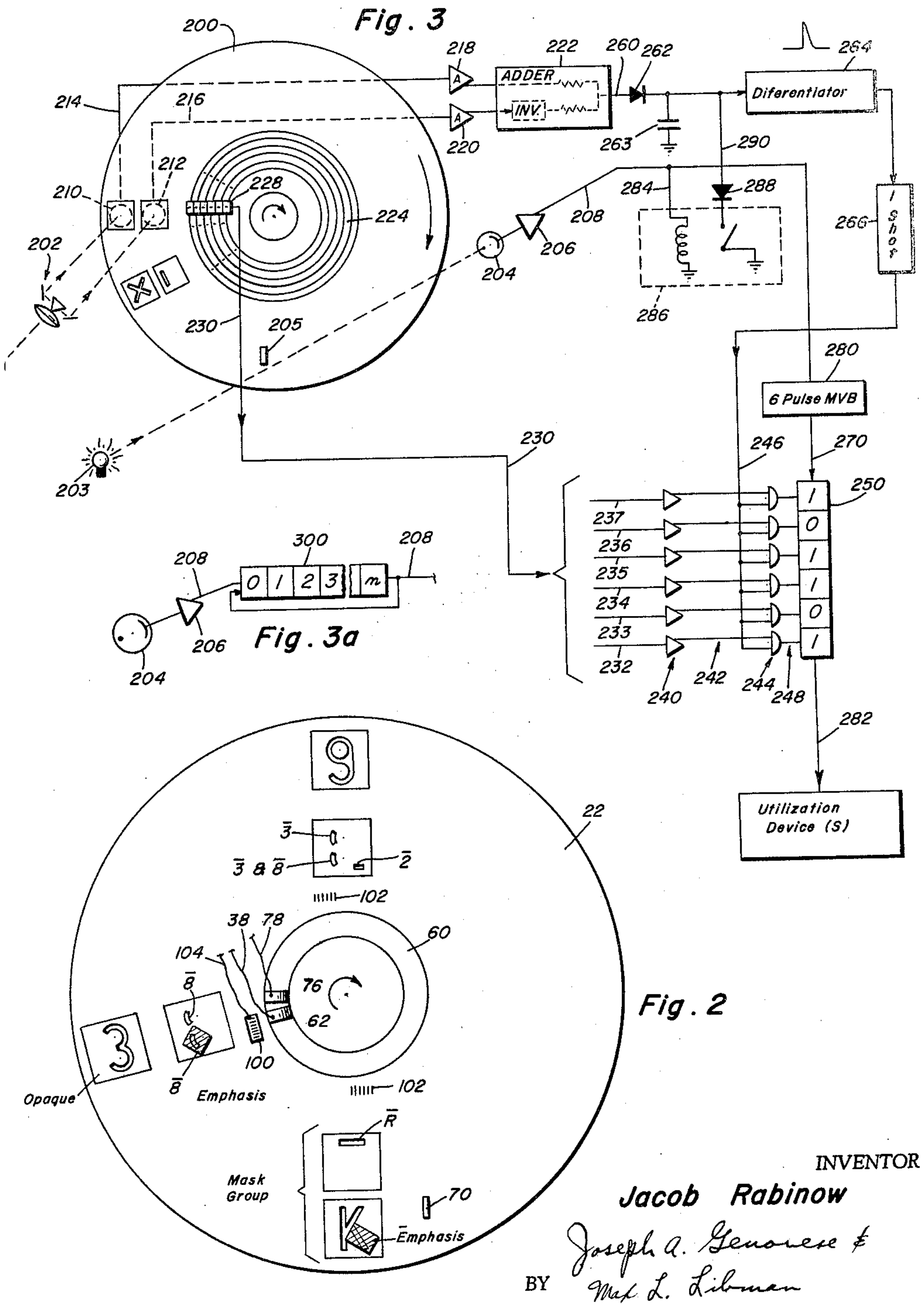
FIGURE 2 is a plan view of the rotary disc in FIGURE 1 with pertinent information supplied by legend.
FIGURE 3 is a diagrammatic view showing a simplified form of my invention.

FIGURE 3$a$ is a fragmentary view showing a modification.

Figure 1A:
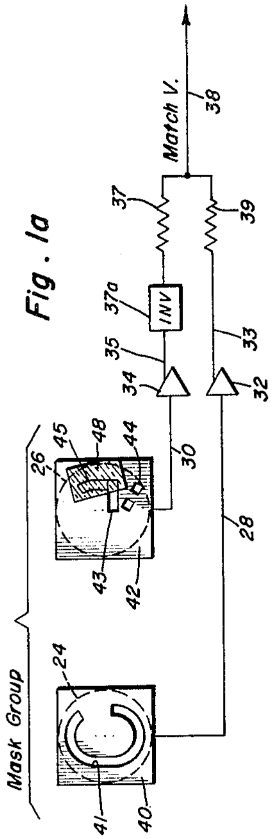
Figure 1:
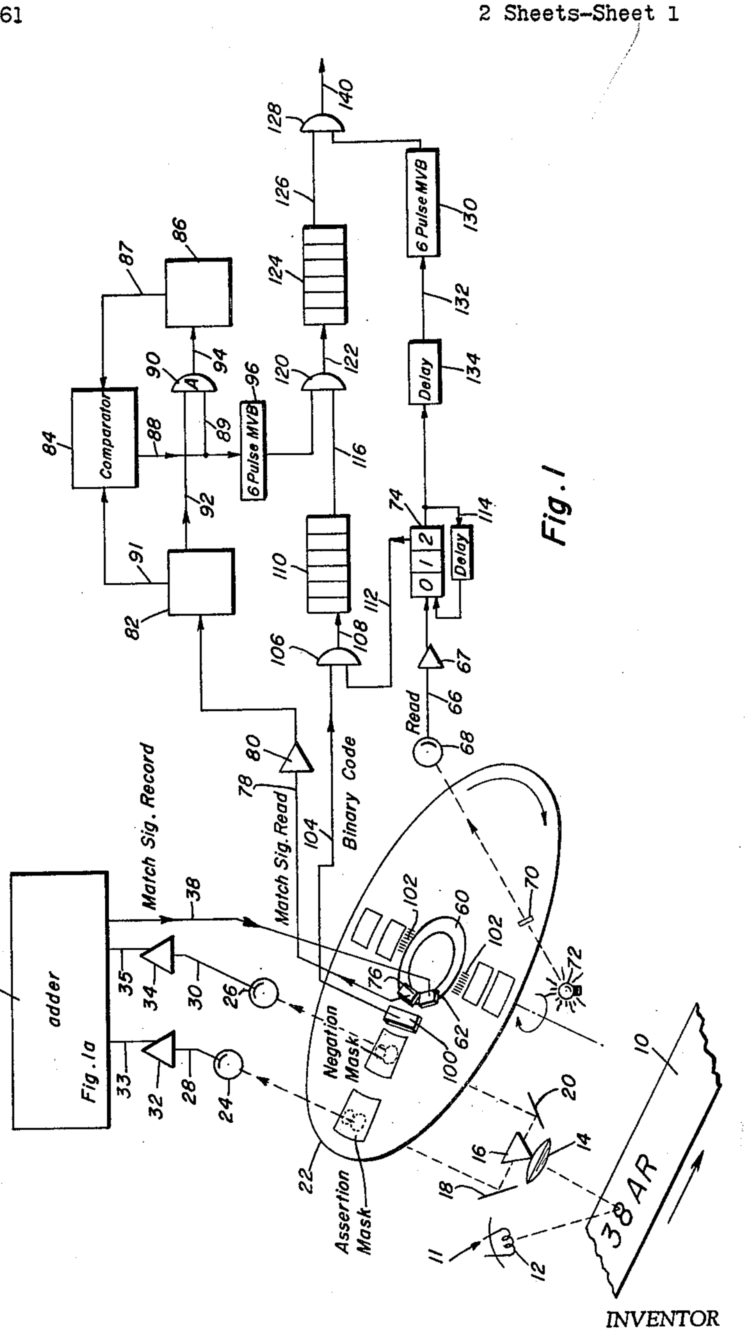

FIGURES 1, 1$a$ AND 2

FIGURE 1 shows a document 10 containing characters whose images are projected by an optical projection system 11 as the document moves in the direction of the arrow. The document mover, being conventional, is not shown. The optical projection system consists of a light source 12, a lens 14 receiving light reflected from the document 10, and a beam splitter 16 which is the same as the beam splitter shown in the Rabinow Patent No. 2,933,246, except that it splits the image into two complete images instead of into numerous images. The light reflected from the beam splitter is further reflected by mirrors 18 and 20 onto one face of a rotary support, for instance, disc 22 having a plurality of masks "groups." The mask "groups" will be discussed in detail later. Assuming that each "group" consists of two masks, although the "groups" may have only one mask or more than two masks as disclosed in application Serial No. 107,135, there are two photosensitive transducers 24 and 26, e.g. photomultipliers, located behind the disc 22 to close to its back surface, although shown a distance from disc 22 in FIGURE 1 for clarity. As disc 22 rotates transducer 24 interrogates one mask of each group while the transducer 26 interrogates the other mask of the group. The transducers are so arranged that they are sensitive to transmitted light, as opposed to reflected light, and further only to the light defining the character image and its background as projected by the projection system. Such an arrangement is preferred (over reflected light systems) to maximize pertinent signal information which may be obtained from the masks as an image of an unknown character is projected on each mask of each group.

The outputs of the transducers are conducted on lines 28 and 30 having amplifiers 32 and 34, to an adder 36 via lines 33 and 35. The construction of the adder is shown in FIGURE 1*a* and will be described later. The adder summarizes the outputs from the transducers on lines 28 and 30, and provides match voltage signals on line 38 which represent the degree of match between the character image and the mask groups. The word "match" includes the intelligence developed at the negation mask as well as the assertion mask and further includes any emphasis for weighting which the assertion and/or negation mask produces.

Masks 40 and 42 (FIGURE 1*a*) represent a single mask-group to recognize the letter C. For the purpose of explanation, assume that the assertion mask 40 is opaque except for the window 41 which is either transparent or open and in the form of the letter C. The negation mask 42 is also opaque except for the intelligence-developing windows therein. One window 43 is in the form of a horizontal bar which, if joined to the window 41 of mask 40, would produce the letter G. Another window 44 in mask 42 is in two pieces and if added to the C window in mask 40 would produce a degraded Q. Window 45 in mask 42 is curved and so located that if the masks 40 and 42 were superimposed, the window 45 would combine with window 41 to form an O.

The added circuit 36 is composed of a resistor network containing resistors 37 and 39 whose respective inputs are on lines 33 and 35 from the amplifiers 32 and 34. The resistors 37 and 39 are connected in parallel to a bus with which the match voltage line 38 is attached. However, the output on line 35 to resistor 37 is inverted by an inverter 37*a* so that the photomultiplier behind mask 42 provides a "not" function of the image projected thereon from the document 10. To emphasize differences between characters, I have superimposed a mask 48 over the window 45 so that even if a white portion of a projected sub area of document 10 falls on the window 45, the transducer 26 will produce an output as though a gray character image was projected on window 45. This technique is termed "weighting."

The net result of the assertion and negation mask-group shown in FIGURE 1*a* is to provide a high (either negative or positive with respect to zero volts reference) match voltage signal on line 38 when the image of the character C is simultaneously projected on both masks.

The match voltage signal is high not only because one image of the character completely covers the window 41 but also because the other image of the letter C will have no part covering windows 43, 44 and 45 of mask 42. In the simplest case, the mask 48 will be a grey mask but this need not be necessarily followed. The mask 48 could be a color filter for one or more of the components of the light, depending on the color-sensitivity of the photomultipliers.

FIGURE 2 shows several other mask-groups. With the preceeding explanation of masks 40 and 42 and also the explanation given in the Rabinow pending application, the significance of the masks in FIGURE 2 are thought to be obvious. The upper group of masks includes an assertion mask with the numeral "9" and a negation mask with a plurality of windows showing that the 9 image is examined to provide a match voltage signal on line 38, by taking into account the "not" features of the characters 3, 8 and 2. The same applies for the other groups of masks but for different characters. I have also shown that the grey masks (for "weighting") can be applied to either the assertion or negation masks, and they can be applied to both if this is found desirable for distinguishing a given character between all other characters that the machine is expected to recognize.

The match voltage signals on line 38 are recorded as a memory input. The recordation could be in a binary register, but the illustrated way of remembering the match voltages associated with each mask group, is to magnetically record the match voltages conducted on line 38, for instance on a magnetic track 60. The recording means are diagrammatically shown as a record head 62 over the track 60 although it is understood that, in practice, a magnetic recorder circuit e.g., an A.C. system, will be required. Further, the magnetic track 60 is shown on the same disc 22 which supports the masks groups although this is not a requirement. A slave disc, drum etc., could be used so long as it is synchronized with the rotation of disc 22. In any case, a signal proportional to the degree of match between the image of the unknown character and each group of masks is recorded during the first revolution of the disc 22.

Summarizing to this point, document 10 is moved while two images of each character are projected on the face of rotating disc 22. One image is projected on the assertion mask and the other on the negation mask of each group. The photosensitive devices 24 and 26 provide inputs to adder 36 whose output signals on line 38 are magnetically recorded on track 60. The recorded signals correspond to the degree of match of the unknown character and each mask-group. In practice, the masks and/or magnetic recorder for track 60 must be normalized to "white" as is understood in the art.

My system keeps track of the cycles of disc rotation because, as summarized above, I record on track 60 during a first cycle of rotation and readout the recorded signals during the second (or any subsequent) cycle. There are many ways of keeping track of disc rotation, a simple one being a photocell 68 which is exposed to the light from source 72 through an opening 70 in disc 22. The signal on line 66 from cell 68 is amplified, as at 67, and applied to a two-stage ring counter 74. The first stage has no output, but the second stage has a read-enabling output on line 112 which is described later because it deals with the readout of track 102 rather than the recording and read-out of signals on track 60.

Magnetic read head 76 is located immediately behind head 62 to read out the signals recorded on track 60 by head 62. "Read" line 78 with an amplifier 80 is connected with head 76 to provide an input to a signal storage device 82. The signal storage device 82 is a part of a comparison circuit including a comparator 84, for instance, a differential amplifier, and another storage device 86. The output line 88 of comparator 84 furnishes one input 89 of an analog AND gate 90 whose other input is the output line 92 from storage device 82. The output line 94 of AND gate 90 is applied to storage device 86. The purpose of the comparison circuit including the AND gate 90, devices 82 and 86 and comparator 84 is to continually compare the read match voltages on line 78 and produce an output on line 88 each time that an incoming signal on line 78 exceeds a previous incoming signal. As an example, assume that a three volt signal from amplifier 80 is applied to storage device 82. It will provide output signals on lines 91 and 92 to comparator 84 and the analog AND gate 90 respectively. Since we are assuming that the three volt signal is the first signal read out from track 60, there will be no signal stored in device 86 to be conducted on line 87 to comparator 84. Consequently, there will be an output signal on lines 88, 89 which coincides with the signal on line 92 thereby satisfying gate 90 and providing a signal on line 94 which is the same (3 volts) as the input signal on line 92. Thus, the three volt signal will be stored in device 86. It is evident from FIGURE 1 that line 88 triggers a six pulse multivibrator 96 but this will be described later. Continuing with the example, assume that the next match voltage signal read from track 60 is conducted on lines 78 to device 82 as a five volt signal. The comparator 84 will detect the fact that the signal on line 91 is higher than the signal on line 87 whereby there will be another output on lines 88, 89 coincident with the five volt signal on line 92. This will again satisfy gate 90 so that the five volt signal will be stored in device 86. This procedure continues until all magnetic signals are read from track 60. A lower signal than that stored will produce no output on line 88, and so will have no effect.

At the same time that the signals are read from track 60, head 100 reads out a code 102 on disc 22. The code is preferably a binary code and it identifies the character represented by the mask group associated with each individual code segment. This feature is of significance because it allows me to read directly the identity of the character which the mask group represents, as opposed to the now usual practice of having the character-identity signal as a component of control signals applied to much more complicated comparator circuits, or an optical code which requires further conversion to computer machine "language."

Line 104 with head 100 diagrammatically represents the read out section of a magnetic recorder for code 102 and is not to be confused with track 60. The line 104 is one input to a two-entry digital AND gate 106 whose output line 108 is connected with register 110. The register may be simply constructed, for instance, by flip flops or the equivalent. The other entry of gate 106 is an enabling signal on line 112 from the second stage of the ring counter 74. When the disc begins its second cycle of operation for a single character of document 10 the counter steps to stage 2 by the amplified signal on line 66. This is fed back through a delay line 114 to reset the counter to the zero stage. During the delay, one output to digital AND gate 106 is continually satisfied so that the binary codes 102 read out on line 104 are stored in register 110.

The output line 116 of register 110 makes available the binary information stored in a register 110. However, the register 110 is not unloaded until there is a signal on line 88, which as described before, represents a higher match voltage on line 60 than was previously detected. Consequently the six pulse multivibrator 96 is triggered to provide a train of pulses to gate 120 whose other input is line 116. The number of pulses of the multivibrator 96 will correspond to a number of stages in register 110, the number "six" being a purely arbitrary selection based on the assumption that code 102 is a six bit binary code. If it were an eight bit binary code, register 110 would have eight stages and eight pulses would be required of multivibrator 96 for each operation thereof. Line 122 from the digital AND gate 120 is an input to register 124 which stores the code identity of the character responsible for the higher match voltage signal read out on line 78 as aforesaid. The outputs of register 124 are conducted on line 126 but only when gate 128 is satisfied. Here again, a six pulse multivibrator 130 interposed in line 132 is used to provide the other necessary entry for gate 128. Line 132 conducts a signal when the last stage of the ring counter 74 is set, and there is a delay 134 interposed in line 132 ahead of the multivibrator 130. Thus, the gate 128 becomes satisfied when the disc 22 has very nearly completed its second cycle of operation, i.e., when all of the mask group position recordings on track 60 have been investigated by the readout head 76. Consequently, when gate 128 is satisfied there will be a character-identity signal as a binary code on line 140 which is the output line of gate 128.

In this form of my system, the read out of the character-identifying code from track 102 has been described as a function of disc rotation. In other words, match signals are recorded on track 60 during one revolution of the disc, and during the second revolution the highest recorded signal causes the proper character-identity code to be read from track 102. I need not be limited to a two-cycle system such as this. By enlarging counter 74 to "*n*" stages (more fully described in connection with FIGURE 3*a*) and connecting line 112 to the "*n*th" stage. I will have $n-1$ recording cycles of disc rotation for each character, and one cycle for read out of track 102.

Furthermore, it is not necessary to base the read cycle on disc revolutions. Instead, I can detect the clear space between printed characters, and use this to trigger the read cycle. Thus, in place of counter 74 I may use a "long" detector such as disclosed in the Rabinow-Holt application Serial No. 820,262, filed on June 15, 1959, or any other equivalent means that provide an output signal when the clear white space between characters is detected.

FIGURES 3 AND 3*a*

Attention is now directed to FIGURE 3 showing a simplified form of my invention where the magnetic recording of the match voltage signals on line 38 is not necessary nor is the magnetic system including heads 62, 76 and the track 60. Further, the character image investigation may be made and the character identity read out in binary code in a single revolution of the disc 200. The disc 200 corresponds to the disc 22 except that it has no provision, corresponding to magnetic track 60 for storing match voltage signals. It has mask groups the same as the previously described mask groups although only one such group is shown in FIGURE 3. The optical projection system 202 is the same as the optical projection system shown in more detail in FIGURE 1. The read trigger photocell 204 is identical to the read trigger photocell 88 and amplifier 206 in the photocell output line 208 corresponds to amplifier 67.

In use of the form of the invention shown in FIGURE 3, two images of an unknown character are projected on one face of the disc 200. The pickup devices, for instance photomultipliers 210 and 212 are located behind the disc so that they operate on transmitted light only, as opposed to reflected light or combinations of transmitted and reflected light. Output lines 214 and 216 from the photomultipliers have amplifiers 218 and 220 interposed therein, and the amplified signals are applied to adder circuit 222 which is the same as the adder shown in FIGURE 1*a*.

Magnetic code track 224, for instance a multichannel track, has pre-recorded binary code data thereon corresponding to the individual characters which the groups of masks represent. Instead of a serial read out as in FIGURE 1, I have shown a multisection parallel read head 228 for the binary code 224, mainly to indicate that either a parallel or serial system can be used in either form of my invention. Line 230 represents a cable containing conductors 232–237 inclusive, there being one for each head section and, of course, there being one section of head 228 for each channel of the magnetic code track 224.

Amplifiers 240 are interposed in lines 232–237 inclusive and the output lines 242 from the amplifiers 240 each form a single input to a group of double entry AND gates 244. The other input of each AND gate 244 is an enabling signal on line 246 which will be described later. The output lines 248 of the AND gates 244 are applied to the individual stages of a shift register 250, the latter being constructed of flip flops or other equivalent bi-stable devices.

In operation, assume that the disc 200 is in the position shown in FIGURE 3 with respect to source 203 of light, i.e. the read opening 205 is in such position that a read signal will not occur on line 208 until the disc has rotated almost a complete revolution. During the rotation of disc 200 signals from amplifiers 218 and 220 will be applied to adder 222 so that the output line 260 of adder 222 conducts a match voltage signal representing the combination of the outputs of photomultipliers 210 and 212. Assume, as before in connection with FIGURE 1, that the first signal is three volts, conducted on line 260. It passes diode 262 or an equivalent unidirectional device to a pulse shaper, for instance a positive differentiator 264 and then to a one shot multivibrator 266. A charge proportional to the 3 volt signal is stored in capacitor 263 which is connected to the output side of diode 262 and to the ground. The output line 246 of the multivibrator will furnish enabling signals to all of the AND gates 244. Consequently, the binary code read out by the multisectional head 228 and conducted on the wires of cable 230 is applied to the stages of resistor 250. However, this character code is merely stored in register 250 because the shift signal which occurs on line 270 to shift out the data in register 250 will not occur until the end of the rotary cycle of disc 200, i.e. when the read opening 205 allows light to pass from source 203 to the photocell 204.

Continuing with the example, assume that the photomultipliers 210 and 212 behind the next group of masks provide signals on lines 214 and 216 which, when added by adder 222, produce an output of five volts on line 260. Since five volt signal is higher than the previous three volt signal which caused memory capacitor 263 to storage a charge proportional thereto, the capacitor will store a new charge proportional to the five volt signal. Again, the differentiator 264 will operate as will the one shot multivibrator 266 so that the magnetic code associated with this second mask group, will be conducted on cable 230 to the AND gates 244 and stored in register 250 in place of the previous data stored therein.

Since we now have a charge stored in memory capacitor 263 proportional to the five volt signal let us assume that the next mask group will be responsible for the photomultipliers producing only a four volt signal on line 260. The diode 262 will not pass this signal because it disconnects due to the higher charge already stored in capacitor 263. Thus, it is ignored. It does not ultimately trigger the necessary inputs on lines 46 to gates 244 to store the binary code corresponding to the mask group, as described below.

Consequently, my circuit continually examines the output on line 260 and stores a charge representing the highest output signal. Note that my circuit is not interested in how much higher or how much lower is the signal than all previous signals; it is only interested in whether it is higher than any previous signal occurring on line 260. Since the four volt signal does not pass diode 262, the differentiator and one shot multivibrator 266 do not function. Thus, the character data corresponding to the character which was responsible for the five volt signal on line 260, remains stored in register 260. If this character is the best match between the character image and all of those represented by the various masked groups, the character data pertaining thereto will remain in register 250 until ultimately read out, which is achieved as follows:

When the disc 200 completes its cycle of rotation, a signal will occur on line 208 as described before, and this operates the multivibrator 280 to provide a signal on line 270. This signal is a pulse train with a sufficient number of pulses to ripple out all of the stages of the register 250 and provide a serial code output on line 282 directly identifying the character. In addition, line 284 connected with line 208, operates a switch 286 which goes to ground. The switch section of the switch is connected through a diode 288 and line 290 to line 260 behind the capacitor 263 so as to discharge the capacitor. Thus, the memory capacitor is prepared for another cycle of operation and the recognition of another character. I have shown switch 286 as an electrically operative switch for simplicity. It may be replaced by a faster circuit, for instance, a Boxcar detector, some of which are described on page 12–19 of Electronics Designers Handbook, a McGraw Hill Publication. The purpose of the Boxcar detector is precisely the same as switch 286 but is faster, if additional speed is required for this portion of my reading machine.

In the reading machine system of FIGURE 1, I record mask-character correlation signals on track 60 during one revolution of disc 22, and read out these signals during the next revolution of the disc. The signals are continuously compared to the preceding signals, and only the highest signal of the group is used. The reading system in FIGURE 3 is the same, except the mask-character comparisons and signal comparisons are made during the same disc revolution. Thus, there is no character criterion against which the signals are compared, and it is desirable to have a minimum acceptable level at which any character is identified. In FIGURE 1 the amplifier 80 can have a predetermined threshold, and in the system of FIGURE 3, the one shot multivibrator 266 can have a threshold below which it will not operate. In both cases the effect is the same, i.e. if the character does not sufficiently match any mask-group, it will not be read.

Although the operation of both forms of my invention has been described in terms of identifying a character in *n* disc revolutions or a single disc revolution, these are ideal cases which can ordinarily be accomplished by using pin-feeders for document 10, or static card handlers, or other document handling methods which precisely control the position of the document. For continuous feeders, both vertical and horizontal registration of the character images and mask-groups are realistic problems. The vertical registration problem is automatically overcome by using a rotary disc. Horizontal registration is solved by having the disc make a number of revolutions for each character. Relying on the clear white space between characters for a read trigger automatically does this, and FIGURE 3*a* shows how to accomplish this in the system of FIGURE 3, while a similar solution can be used in FIGURE 1, as discussed previously.

FIGURE 3*a* shows a ring counter of *n* stages interposed in line 208 from the amplifier 206 of photocell 204. The number *n* corresponds to the number of revolutions of disc 200 for each character-identity, as follows: The signal on line 208 actuates the multivibrator 280 which reads out register 250, and closes switch 286 to discharge capacitor 263. Thus, the counter 300 withholds this signal for *n* revolutions of disc 200.

It is understood that various changes and modifications may be made without departing from protection of the following claims:

I claim:

1. In an optical mask reading machine where the masks are arranged in groups with at least some of the groups containing an assertion mask and a negation mask, a rotary member supporting said mask groups, means to project a plurality of images of an unknown character on said mask-groups which are sequentially presented to said images, photosensitive means for sequentially providing signals which correspond to the degree of match between the character images and each mask-group, a character-identity code rotatable with said member and associated with each mask group, selection means for detecting and storing the signal representing the highest correlation between said images and said mask groups as they are sequentially presented to the images due to rotation of said member, and means responding to said selection means for remembering the code associated with the mask group responsible for the highest correlation and for replacing the remembered code with a new code each time that the new correlation signal is stored in said storing means.

2. The reading machine of claim 1 wherein said selection means include a magnetic recording means to record signals corresponding to the degree of match of said image and each mask group.

3. In a reading machine, a rotary member provided with optical masks, at least some of said masks arranged in groups formed of an assertion and a negation mask, transducer means associated with said mask groups to provide signals corresponding to the degree of match between an unknown character image and said mask groups, means to store said signal during a first revolution of said member, preformed code means on said member providing the character-identity for each mask group, means to read out said stored signals during a second revolution of said member and compare said readout signals to each other for selection of the signal representing the highest correlation between the character image and one mask group, and means to read out the preformed code associated with the last-mentioned mask group.

4. The machine of claim 3 wherein said preformed code means directly identifies characters.

5. In an optical reading machine provided with projection means for images of characters, a movable support member having a plurality of mask groups, at least some of said groups including a first mask having a window in the shape of a given character and a second mask with a character portion to emphasize significant differences between said given character and all other characters which the machine is expected to identify, code means movable with said support member, said code means having information of the identity of the characters represented by said mask groups, transducers responding to light transmitted through said mask groups for providing signals representing the degree of match of the character image and one mask of each group and also signals representing said significant differences, adder means for said signals of one mask group and providing an output which corresponds to both of the transducer signals, means for comparing the output of said adder means during the movement of said support and to provide a signal when an adder output exceeds all previous outputs, and a register, means responsive to the last-mentioned signal for reading out said code corresponding to the mask group responsible for said last-mentioned signal and for applying the code information to said register.

6. In an optical reading machine provided with projection means for images of characters, a movable support member having a plurality of mask groups, at least some of said groups including a first mask containing a window in the form of a given character and a second mask with a character portion to emphasize significant differences between said given character and all other characters which the machine is expected to identify, code means on said support member, said code means having information of the identify of the characters represented by said mask groups, transducers responding to light transmitted through said mask groups for providing signals representing the degree of match of the character image and one mask of each group and also signals representing said significant differences, adder means for said signals of one mask group and providing an output which corresponds to both of the transducer signals, means for comparing the output of said adder means during the movement of said support and to provide a signal when an adder output exceeds all previous adder outputs, a register, means responsive to the last-mentioned signals for reading out said code corresponding to the mask group responsible for said last-mentioned signal and for applying the code information to said register, and means coordinated with the movement of said support for providing a trigger signal to unload said register thereby making available the code equivalent of the unknown character as the register output.

7. The optical reading machine of claim 6, wherein said code means are magnetic.

8. The optical reading machine of claim 6 and means including semi-transparent means over parts of some of said masks to emphasize character-distinctive portions by effecting the light transmitted therethrough to their associated transducers.

9. In a reading machine for characters of a set, wherein said machine provides first signals as a result of a comparison of an unknown character with a character criterion for each character of the set; the improvement comprising storage means to store the most favorable of said signals occurring from the first set of comparisons of the unknown character to the criteria for all of the characters of the set, and means to remember the identity of the character of the set corresponding to the criterion responsible for said most favorable signal, comparison means to compare said stored signal to subsequent first signals while the same unknown character is being compared to said criteria for the second time, said storage means storing the better signal of each comparison by said comparison means, and said remembering means remembering the identity of the character corresponding to said better stored signal.

10. The subject matter of claim 9 wherein said remembering means includes a register which stores the character identity as a code.

11. In a character reading machine for a set of characters, wherein the machine has examining means to examine an unknown character more than once and provide electrical signals which correspond to the degree of match between the unknown character and criteria representing the characters of said set; the improvement comprising storage means to store a first signal corresponding to the best match of the unknown character with one of said criteria as a result of a first examination and comparison of the unknown character by said examining means, and means to remember the tentative identity of the unknown character ascertained by said best match; said storage means storing a new signal corresponding to any better match of the same unknown character with any of said criteria as a result of a second examination and comparison of the same unknown character, provided that said new signal is more favorable than said first signal in which case said tentative identity of in said remembering means is altered to conform to the character criterion which is responsible for said new signal.

References Cited by the Examiner

UNITED STATES PATENTS

| | | | |
|---|---|---|---|
| 2,590,091 | 3/52 | Deval | 235—61.11 |
| 2,775,172 | 12/56 | Higonnet | 340—146.3 |
| 2,935,619 | 5/60 | Rogers | 340—146.3 |
| 2,985,366 | 5/61 | Scarrott | 340—146.3 |

MALCOLM A. MORRISON, *Primary Examiner.*